(12) United States Patent
Seifert

(10) Patent No.: US 12,727,585 B2
(45) Date of Patent: Sep. 8, 2026

(54) ANIMAL-ACTIVATED SYSTEM USING UNIQUE BIOLOGICAL FEATURES

(71) Applicant: Alexander P. Seifert, Antigo, WI (US)

(72) Inventor: Alexander P. Seifert, Antigo, WI (US)

( * ) Notice: Subject to any disclaimer, the term of this patent is extended or adjusted under 35 U.S.C. 154(b) by 0 days.

(21) Appl. No.: 19/187,596

(22) Filed: Apr. 23, 2025

(65) Prior Publication Data

US 2025/0331504 A1 Oct. 30, 2025

Related U.S. Application Data

(60) Provisional application No. 63/637,960, filed on Apr. 24, 2024.

(51) Int. Cl.
*A01K 29/00* (2006.01)
*G06F 21/32* (2013.01)

(52) U.S. Cl.
CPC ............ *A01K 29/005* (2013.01); *G06F 21/32* (2013.01)

(58) Field of Classification Search
CPC .............................. A01K 29/005; G06F 21/32
See application file for complete search history.

(56) References Cited

U.S. PATENT DOCUMENTS 9,826,713 B2 * 11/2017 Hosseini ................ G06V 40/10
10,268,880 B2 * 4/2019 Wee ..................... A61B 5/0077
11,019,250 B2 * 5/2021 Choi .................... H04N 23/633
2015/0078626 A1 * 3/2015 Kinard .................. A01K 11/00
382/110
2025/0176501 A1 * 6/2025 You ...................... G06F 3/0484

FOREIGN PATENT DOCUMENTS

KR 20220113604 A * 8/2022 ............ G06Q 50/10

OTHER PUBLICATIONS

Portable Device for Measuring Complex Authentication Information for Identification of Companion Animals (Year: 2022).*

* cited by examiner

*Primary Examiner* — Yvonne R Abbott-Lewis
(74) *Attorney, Agent, or Firm* — Merchant & Gould, P.C.

(57) ABSTRACT

Systems and method for animal identification using animal nose prints are disclosed. The system comprises a sensor connected to a computer. The computer contains one or more unique animal nose prints. When an animal nose touches the sensor, the computer determines if the animal nose matches one of the nose prints in the computer. If it does, the system can include a motor or pump to activate additional events such as opening a door, opening a gate, or dispensing food, treats, medicine, or water.

22 Claims, 3 Drawing Sheets

ANIMAL-ACTIVATED SYSTEM USING UNIQUE BIOLOGICAL FEATURES

CROSS-REFERENCE TO RELATED APPLICATION

This application claims benefit to U.S. Provisional Patent Application No. 63/637,960 filed Apr. 24, 2024, and titled, "ANIMAL-ACTIVATED SYSTEM USING UNIQUE BIOLOGICAL FEATURES," the disclosure of which is hereby incorporated by reference in its entirety.

BACKGROUND

Pet doors or entrances have evolved from simple holes in a wall or fence to smaller swinging flaps or doors in the lower portion of an exterior home door. More modern pet doors or entrances are linked with a proximity tag on an animal collar that unlocks the door when the desired animal is close to the door but otherwise remains locked to prevent unwanted domestic animals, wild animals, or intruders from entering the door. Such devices require that the animal be wearing a collar with a proximity tag on it. Not all animals wear collars and it is not desirable for collars to add bulk or weight. It is against this background that the present disclosure is made.

SUMMARY

The present disclosure relates to systems and methods for animal identification using a sensor and a computer.

In one aspect, the system includes a sensor for receiving an animal nose, a computer in communication with the sensor, and optionally a mobile application in communication with the computer. In some embodiments, the system can optionally include a motor or pump. Upon activation of the sensor, the motor or pump can open a door, open a gate, or dispense food, treats, water, or medicine.

In another aspect, the method includes storing one or more unique animal nose prints into a computer in communication with a sensor, contacting the sensor with an animal nose, and determining if the animal nose matches the one or more unique animal nose prints in the computer. The method can optionally include activating a motor or pump if the animal nose matches the one or more unique animal nose prints in the computer. If there is a match between the animal nose and an animal nose print stored in the computer, alerts or notifications can be generated. For example, one or more alerts may be generated if the animal nose matches an animal nose print in the computer. Exemplary alerts include audio alerts, visual alerts, taptic alerts, and combinations thereof. Alerts can also be generated if the animal nose does not match an animal nose print in the computer. Notifications can also be sent to a mobile device. The notifications can include information about an event that occurred including dates, times, events, animal identification, a photo, or a camera video or image.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
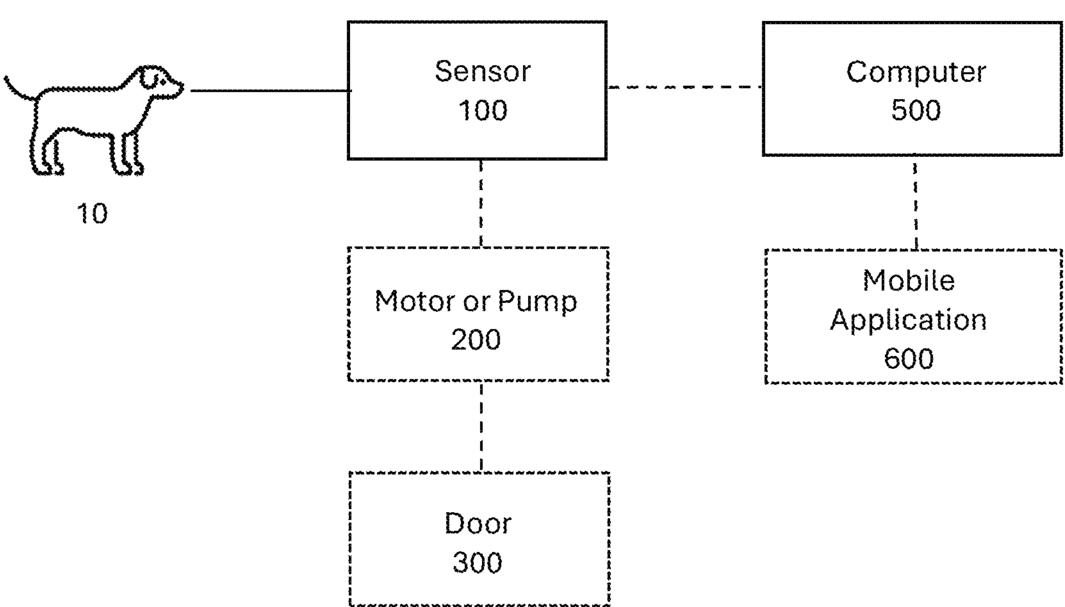
FIG. 1 is a diagram depicting an embodiment of the present disclosure with a sensor and an optional motor.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. It should be understood that this invention is not limited to the particular methodology, protocols, and products, etc., described herein and as such may vary. The terminology used herein is for the purpose of describing particular embodiments only. The following detailed description is therefore not to be taken in a limiting sense, and the scope of the present disclosure is defined by the appended claims and their equivalents.

Unless defined otherwise, all technical and scientific terms used herein have the same meaning as those commonly understood to one of ordinary skill in the art to which this invention pertains.

For the purposes of this application the following terms shall have the following meanings:

As used herein and in the claims, the singular forms "a," "an", and "the" include the plural reference unless the context clearly indicates otherwise.

Other than in the operating examples, or where otherwise indicated, all numbers expressing quantities of ingredients or reaction conditions used herein should be understood as modified in all instances by the term "about." The term "about" when used herein in connection with numerical values means±20% and with percentages means±1%.

As used herein, the term "comprising" refers to a system or method that is inclusive and does not exclude additional elements or method steps.

As used herein, the term "consisting of" refers to a system or method that excludes the presence of any additional element or method steps.

As used herein, the term "consisting essentially of" refers to a system or method that is inclusive of additional elements or method steps that do not materially affect the characteristic(s) of the system or method.

Animal doors or entrances for domestic animals or livestock are desirable to allow movement of the desired animal or pet, prevent the movement of undesired animals or intruders, and allow animals to move when they need to without having to wait for human intervention. For example, instead of pet owners having to let pets outside to eliminate waste or open the door at night to allow pets back inside the house, it is desirable for pets to go in or out of the house as needed without intervention by the pet owner. Similarly, it is desirable for livestock to move freely without needing human intervention and prevent undesired animals from entering certain locations on a farm or ranch.

Current options for animal doors or entrances have evolved from simple holes in a wall or fence to smaller swinging flaps or doors in the lower portion of an exterior home door. More modern animal doors or entrances are linked with a proximity tag on an animal collar that unlocks the door when the desired animal is close to the door but otherwise remains locked to prevent unwanted domestic animals, wild animals, intruders, debris, or bad weather from entering the door. Such devices require that the animal be wearing a collar with a proximity tag on it. Not all animals wear collars. For example, many cats do not wear collars and livestock do not wear collars. Additionally, sensors located on collars can get knocked against things and break, can fall off, are bulky, and can add significant weight around the neck of smaller domestic animals.

The present disclosure relates to the use of a unique animal nose print to activate a sensor and open a door, gate, or entrance. Animal nose prints, like a fingerprint, have grooves, beads, and smooth areas that make each nose print unique. In one embodiment, a sensor is placed on either side of the door, gate, or entrance where the animal can make contact with the sensor by placing its nose against the sensor. Once the animal contacts the sensor, the sensor queries a computer to determine if the nose print on the animal's nose is a match with a nose print in the computer. If the nose print is a match, the system may optionally activate a motor or pump to open the door, gate, or entrance, or to dispense food, medicine, treats, or water. Because the sensor is triggered by the unique nose print of the animal, it only activates for the desired animals and not other neighborhood pets, wild animals, pests, or intruders, and leaves the door otherwise closed to debris and the outdoor weather.

Disclosed herein is a system and method for animal identification. FIG. 1 depicts an exemplary schematic of the use of the disclosed system. In FIG. 1, the system includes a sensor (100) for measuring nose prints. The system includes an optional motor or pump (200). The motor or pump can activate a structure such as a door (300). In some embodiments, instead of a door, the motor or pump activates a gate, a dispenser for food, treats, or medicine, or a pump that is connected to a water source.

Exemplary sensors (100) include capacitive sensors, optical cameras or sensors, ultrasonic sensors, and thermal sensors to capture the unique features of an animal's nose. The sensor measures the unique features of the nose print and sends data on the measured nose print to a computer. The computer compares the measured nose print to the nose prints stored in the computer memory. If there is a match, the system may optionally activate the motor or pump (200) to activate further structure such as a door (300), dispenser, or pump.

In some embodiments, the sensor (100) is physically or wirelessly connected to a computer (500). The computer (500) algorithms for nose print pattern matching and authentication involve data capture and storage, real-time authentication, an authentication response, and security features.

For the data capture and storage, the computer captures unique topographical features of nose prints including grooves, beads, and smooth areas that make each nose print unique. The nose print data is securely stored in the computer's memory database for authorized animals. The computer database maintains records of stored prints along with associated data like dates, times, events, animal identification, photos, camera images, videos, and combinations thereof. The computer includes computer memory to store, add, or delete one or more nose prints for one or more animals.

The computer's real-time authentication algorithms are designed to measure the unique features of the nose print and transmit this data to the computer when an animal contacts the sensor. The computer compares the measured nose print against the stored nose prints in its database. The system determines if there is a match between the presented nose print and authorized prints.

If there is a match, the computer's authentication response can trigger predetermined actions like activating motors/pumps, generate audio, visual, or taptic alerts, send notifications to connected mobile devices, and logging the successful authentication event. System notifications can convey to a user that the door is open or that the pet has gone out or come back in the house. In some embodiments, the mobile application (600) allows a user to interact with the system. For example, the mobile application (600) may allow a pet owner to lock or unlock the door remotely in order to keep the pet inside or outside, or remotely turning the system off for times when a pet owner is away on vacation and no pets are at the house. The mobile application (600) may allow pet owners to manage multiple pet doors for one location (e.g., a front door and a back door) or multiple pet doors at multiple locations (e.g., a primary home and a vacation home).

The computer's security features can be programmed with modes like night time or vacation mode to prevent unwanted activation. In these modes, the system can be set up so that it can't be activated at all. This mode may be helpful to prevent unwanted activation when an owner and pet are away from a location.

Authentication events are logged with associated data including dates and times, event details, animal identification, photos, videos, or camera images. The authentication system can interface with mobile applications for remote monitoring and control, home automation systems for coordinated functionality, and security systems for comprehensive access control. For example, the computer (500) can be connected to a household control system such as a connected home system, a smart home system, a home security system, or other control system that controls one or more household functions. The computer (500) may send information to the household control system so that information on the system or activation of the system can be included with other data as part of a household dashboard or controlled using the household control system. For example, information on the activation of the system can be included together with information on the household temperature, doorbell activity, door lock status, garage door status, household appliance status, household lighting status, exterior lighting status, and the like.

The mobile application (600) can have a visual or audio alert or message if the battery is getting low or if there is an error in operating (e.g., the door remains open or remains closed). In some embodiments, the system includes a speaker (not shown) and the mobile application (600) allows for a pet owner to speak to the pet through a speaker. In some embodiments, the unlocking of the door corresponds to an audio or visual cue to the pet that helps train the pet when the door is unlocked.

In some embodiments, a camera (not shown) is included. The camera provides a visual identification of an animal and an image that can be stored with other event data or sent as part of a notification. Additionally, a camera can serve a secondary security function by monitoring other activity at the door such as children coming home, deliveries left on the porch, visitors coming over, or criminal activity.

In some embodiments, the computer (500) incorporates a number of security measures to protect the nose print data and associated authentication records. For example, the computer may maintain secure logs of authentication attempts, dates and times of access, animal identification data, and photos, videos, and camera images from authentication events. The computer system may integrate with household security and control systems enables coordinated security functionality. The computer system may utilize anti-spoofing technology or unauthorized access prevention. The computer system may require multi-factor authentication capabilities through unique nose print pattern recognition, optional camera visual verification, and time-based access restrictions. The computer system may include programmable security modes such as night time mode to prevent unauthorized nighttime access, vacation mode to completely disable system when owners are away, or customizable time-based access restrictions. The computer system can maintain backup authentication and redundancy by utilizing multiple sensor technologies and providing redundant authentication methods.

In some embodiments, data on the computer system is backed up to secondary computer or home computer, external hard drive, secure server, or cloud system. Backed up data may include the stored nose print data, authentication records, event logs including dates, times, and animal identification, or photos, videos, or camera images from authentication events. Backing up the data ensures that the data can be recovered if needed.

In addition to the security features on the computer system, the system can include secondary safety features such as auto-reverse functionality if door encounters an obstruction, safety sensors to prevent door closure while in use, and timed auto-close features if passage not completed. The system can be controlled remotely via mobile application interface, integration with home automation systems, and connected security systems.

In some embodiments, the system can include a backup power supply to maintain functionality during power outages. The backup power system may include rechargeable batteries that provide continuous power to maintain critical system functions including the sensor, computer, motor/pump operations, and security features. The backup power supply can be configured to provide emergency power for predetermined durations of up to 2 hours, up to 6 hours, up to 12 hours, up to 18 hours, up to 24 hours, or up to 48 hours when main power is interrupted. This backup power capability ensures continued operation of essential features like door access control, authentication, and security monitoring even during extended power outages. The system may include power management features that optimize battery usage during outages, such as entering a low-power mode while maintaining core authentication and security functions. The backup power system integrates with the existing power options which include replaceable batteries, rechargeable batteries, solar power, direct plug-in capability, and hardwired electrical connections.

In some embodiments, the sensor is located on a sensor pad. The sensor pad may be deformable and include a spring, cushion, gel, or non-Newtonian fluid that deforms slightly when the nose is pressed against the sensor pad and conforms to the nose surface when contacted, enabling more complete surface contact and ensuring accurate identification by capturing the distinctive grooves, beads, and smooth areas that make each nose print unique. This allows more of the sensor to contact the surface of the nose and ensure a correct identification. In some embodiments, the sensor pad construction includes a weatherproof exterior layer that has a durable construction capable of withstanding rain, freezing temperatures, sun exposure, heat, and dirt. The weatherproof exterior layer is designed for repetitive contact without degradation. In some embodiments, the sensor pad construction includes a deformable layer that includes a spring, cushion, gel, non-Newtonian fluid, or other material that provides controlled deformation when pressed, returns to original shape after contact, and maintains consistent sensing surface. In some embodiments, the sensor pad constructions includes an integrated sensor such as a capacitive, optical, ultrasonic, or thermal sensor. The sensor pad construction is designed to protect the sensor components while maintaining scanning functionality through a deformable layer. This enables accurate measurement of nose print features through the deformable material. In some embodiments, the sensor pad is configured as a single section or configured with multiple discrete sections where each section corresponds to different predetermined actions. Each section may include visual icons, symbols, or alpha-numeric indicators for different functions. The pad construction ensures reliable nose print capture while protecting the internal sensor components from environmental conditions and repeated use. The deformable material allows sufficient compression to capture nose print details while maintaining the structural integrity needed for accurate sensing and authentication.

Figure 3A:
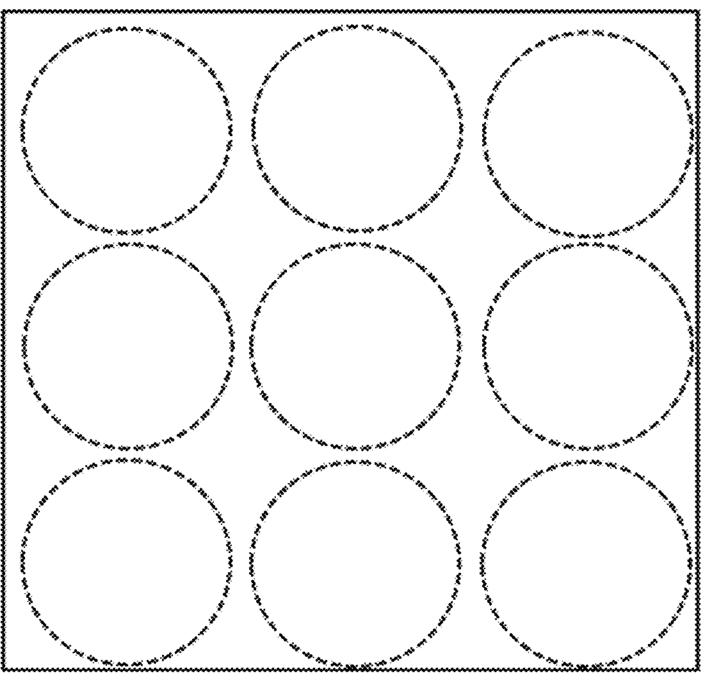
FIGS. 3A and 3B depict two embodiments of the sensor pad.
Figure 3B:
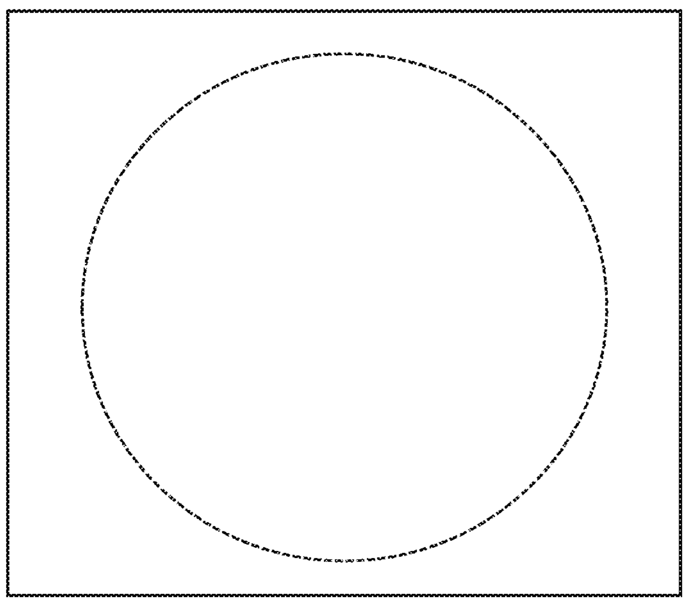

FIG. 3A show an exemplary sensor pad with nine sections. It is understood that alternative sensor pad configurations could be used. For example, the sensor pad may include one section (as shown in FIG. 3B), two sections, three sections, four sections, five sections, six sections, seven sections, eight sections, nine sections, 10 sections, 15 sections, or 20 sections. For example, depressing a first section of the pad may activate the entrance, depressing a second section of the pad may indicate that the pet is hungry, depressing a third section of the pad may indicate that the pet is thirsty, depressing a fourth section of the pad may indicate that the pet wants attention, wants to play, or wants affection, and depressing a fifth section may indicate that the pet wants to go for a walk. Over time, the pet will become trained as to which section of the pad corresponds with which action. The sensor pad may include visual icons, symbols, or alpha-numeric letters differentiating which section of the sensor is for which action.

In one embodiment, the system preferably includes two sensors-one on either side of the door so that an animal (10) can activate the system coming in and going out each direction. In some embodiments, the sensor is weatherproof and waterproof and can withstand rain, freezing temperature, sun exposure, hot temperatures, dirt, and repetitive contact.

Exemplary motors (200) include commercially available motors such as those found in vending machines, food dispensers, and rotational motors. In some embodiments, a pump could be used with or instead of a motor, for example to dispense water. The motor may be powered by replaceable or rechargeable batteries, solar powered from the exterior side of the door, plugged in to an outlet, or hard wired to electricity through the door.

FIG. 1 shows a door (300). It is understood that door (300) could be a door, a gate, a dispenser, or a water pump. The dispenser can dispense food, treats, or medicine. The water pump can be connected to a water source and a water bowl or trough. The water bowl or trough preferably includes a sensor or float switch to prevent the water pump from overfilling the water bowl or trough. The computer (500)

may include a safety feature that prevents the water pump from running for longer than a predetermined time to further prevent the water pump from overfilling a water bowl or trough. For example, the computer may shut the water pump off after 5 seconds, after 10 seconds, after 15 seconds, after 20 seconds, after 25 seconds, or after 30 seconds if the sensor or float switch has not already been triggered.

When door (300) is a door, the door may be a hinged door that is hinged at the top or side and mechanically swings open when activated. In other embodiments, the door (300) is a flexible flap that is held in place by stoppers (not shown) that are released when the sensor is activated so that the flexible flap can flex to let the pet through the opening.

The door (300) dimensions can vary depending on the size of the pet. In some embodiments, the door opening is from about 8 inches wide to about 24 inches wide, about 10 inches wide to about 24 inches wide, or about 12 inches wide to about 24 inches wide. In some embodiments, the door opening is from about 8 inches tall to about 36 inches tall, about 12 inches tall to about 36 inches tall, or about 18 inches tall to about 36 inches tall. Exemplary openings include about 8 inches by about 8 inches, about 10 inches by about 12 inches, about 12 inches by about 16 inches, about 18 inches by about 24 inches, and about 24 inches by about 36 inches.

When the door (300) is at rest, the door (300) may be secured in place by one or more locks. When an animal (10) activates the sensor (100) and the computer (500) determines that the animal is a match to an animal in the database, the computer (500) releases the lock. Once the door (300) is not locked, in some embodiments, the door (300) may freely swing in place and allow the animal (10) to push it out of the way as it passes through. After some period of time, the door re-locks. That period of time could be about 30 seconds, about 15 seconds, about 10 seconds, or about 5 seconds.

In other embodiments, the door may mechanically open to allow the animal (10) to pass through. In some embodiments, the computer (500) allows the door (300) to remain open until a second sensor (not shown) detects that an animal has passed through the opening. In this embodiment, the computer (500) may optionally have a time limit where if no animal has been detected as passing through, it automatically closes after some period of time such as about 30 seconds, about 15 seconds, about 10 seconds, or about 5 seconds. In some embodiments, the door remains opening for a period of time of about 10 seconds to about 60 seconds, about 15 seconds to about 45 seconds, about 20 seconds to about 30 seconds, or about 10 seconds to about 30 seconds. In some embodiments, the door (300) has a safety sensor or auto-reverse feature on it such that when closing, if it hits an object before closing, the door opens up again. This safety feature ensures that the door (300) does not accidentally close on a pet while the pet is going through the opening.

In some embodiments, the door (300) freely swings once the pet has moved through the door. In certain embodiments, one or more rubber stoppers on the bottom of the door hit raised bumpers on the bottom of the door opening frame. The friction from the rubber stopper hitting the bumpers slows down the door swing until the door has stopped and the rubber stopper comes to rest in between the bumpers. At this point, the door re-locks. Allowing the door to freely swing until it has come to rest before re-locking ensures that the pet has made it safely through the door before it re-locks.

In some embodiments, the present disclosure includes audio, visual, or taptic cues when the animal (10) presses their nose to the sensor (100) and successfully activates the door. Such cues could include sounds, chimes, lights, or vibrations. In some embodiments, the cues can vary to indicate different events (e.g., door opening, door closing, sensor misread, food, treats, medicine, or water dispensed). With repetitive use, the pets will become trained to understand the significance of the audio, visual, and taptic cues. In embodiments where the sensor pad includes one or more sections that correspond with other functionality, the audio, visual, and taptic cues can be correlated to the functionality of each section such that with repetitive use, the pets will become trained to understand the significance of the cues.

Figure 2:
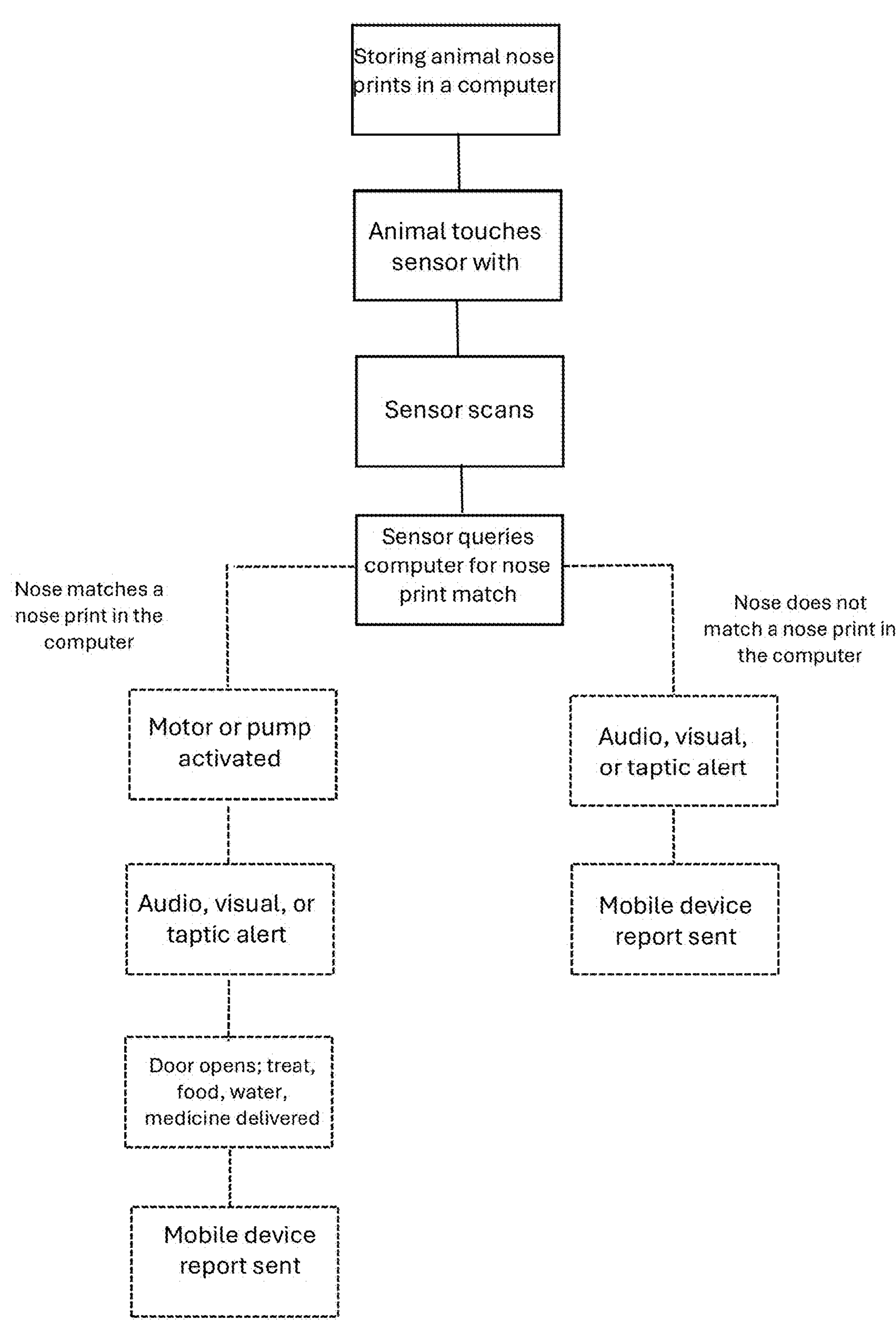
FIG. 2 is a flow diagram depicting the method of the present disclosure.

FIG. 2 is a flow diagram showing the method of using the system of animal identification. According to this embodiment, animal nose prints are loaded into the computer (500). During use, the animal (10) contacts the sensor (100). When an animal's nose contacts the sensor pad, the sensor (100) measures these unique topographical features and transmits the captured nose print data to the computer (500) for authentication. The computer (500) then performs pattern matching by comparing the received nose print data against the database of stored authorized nose prints to determine if there is a match. Upon successful authentication, the system can trigger predetermined actions while maintaining a secure log of all authentication attempts. The sensor components are designed to be weatherproof and waterproof, capable of withstanding environmental conditions including rain, freezing temperatures, sun exposure, heat, dirt, and repetitive contact while maintaining reliable scanning functionality.

If the nose print is a match, the computer (500) can optionally activate the motor or pump, generate one or more audio, visual, or taptic alerts, open a door or gate, dispense food, treat, medicine, or water, generate a notification on a mobile device, and combinations thereof. If the nose print is not a match, the computer (500) can optionally do nothing, generate an audio, visual, or taptic alert, generate a notification on a mobile device, and combinations thereof.

The system has been described in connection with use with domestic animals at home. The disclosed system can also be used in commercial or clinical settings with pet boarding facilities, animal shelters, veterinary clinics, animal hospitals, zoos, and the like. For example, in a boarding facility where each pet has their own room, the entrance to the room can be programmed with a pet's nose print. This may be beneficial in keeping animals separate and ensuring that illness, such as kennel cough, does not spread from one animal to another.

In a livestock setting, the system can be used for identification, sorting, separating, isolating, feeding, watering, and disbursement of medications.

The present disclosure has been described with respect to doors and gates. It is understood that the present disclosure can also be used to automate other pet care features such as the delivery of food, treats, water, or medications. In these embodiments, the computer (500) can be programmed to deliver food, treats, water, or medicine on a certain timetable when the pet is ready for it. For example, if a pet is supposed to eat dinner after 5:00 pm, the computer (500) can be programmed not to dispense food before 5:00 pm. Once it is 5:00 pm, if the pet triggers the sensor (100) using its nose, the system will dispense dinner. In this way, the food is only provided if the pet wants it and the pet owner gets to control when and how much the pet eats or drinks. The same can be true for treats, water, and medicine.

In some embodiments, the sensor (100) is used alone without activating another feature. This may be useful for animal identification. This embodiment is useful for veterinarians, animal shelters, animal control, zoos, wildlife tracking, and researchers.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An animal identification system comprising:
(a) a sensor pad having a plurality of discrete sections configured to receive an animal nose print;
(b) a computer in communication with the sensor pad and configured to:
(1) store a plurality of unique animal nose prints;
(2) receive nose print data from the sensor pad; and
(3) determine if received nose print data matches a stored unique animal nose print;
wherein each discrete section of the sensor pad corresponds to a different predetermined action; and wherein the computer is configured to initiate the predetermined action corresponding to the discrete section contacted when a match is determined.

2. The system of claim 1, wherein the sensor pad comprises a sensor and is deformable.

3. The system of claim 2, wherein the sensor pad comprises a spring, a cushion, a gel, or a non-Newtonian fluid.

4. The system of claim 1, wherein the sensor pad comprises a sensor selected from the group consisting of capacitive sensors, optical cameras, optical sensors, ultrasonic sensors, thermal sensors, and combinations thereof.

5. The system of claim 1, further comprising a door.

6. A method of animal identification and training comprising:
(a) storing one or more unique animal nose prints in a computer database;
(b) providing a deformable sensor pad having multiple discrete sections, each section corresponding to a different predetermined action;
(c) receiving nose print data when an animal contacts one of the discrete sections;
(d) determining if the received nose print data matches a unique animal nose print stored in the computer database;
(e) generating a sensory cue indicating when a successful match is determined; and
(f) initiating the predetermined action corresponding to the contacted discrete section when a successful match is determined;
wherein the predetermined actions are selected from the group consisting of opening a door, dispensing food, dispensing water, dispensing medicine, and generating a notification.

7. The method of claim 6, further comprising (g) activating a motor or a pump when the received nose print data matches a unique animal nose print stored in the computer database.

8. The method of claim 7, wherein the motor opens a door, opens a gate, or dispenses animal food, treats, or medicine.

9. The method of claim 7, wherein the pump is fluidly connected to a water source.

10. The method of claim 9, wherein activating the pump refills a water bowl.

11. The method of claim 10, wherein the water bowl further comprises a sensor or a float switch to prevent overfilling.

12. The method of claim 6, further comprising generating one or more alerts when the received nose print data matches a unique animal nose print stored in the computer database.

13. The method of claim 12, wherein the one or more alerts are selected from the group consisting of an audio alert, a visual alert, a taptic alert, and combinations thereof.

14. The method of claim 6, further comprising generating one or more alerts when the received nose print data does not match any unique animal nose print stored in the computer database.

15. The method of claim 14, wherein the one or more alerts are selected from the group consisting of an audio alert, a visual alert, a taptic alert, and combinations thereof.

16. The method of claim 6, wherein the deformable sensor pad comprises a sensor selected from the group consisting of capacitive sensors, optical cameras, optical sensors, ultrasonic sensors, thermal sensors, and combinations thereof.

17. The method of claim 6, further comprising storing data in a computer.

18. The method of claim 17, wherein the data comprises dates, times, events, animal identification information, a photograph, or a camera image.

19. The method of claim 6, further comprising generating a notification on a mobile device.

20. The method of claim 19, wherein the notification comprises dates, times, events, animal identification information, a photograph, or a camera image.

21. An animal-activated home automation system comprising:
(a) a weatherproof sensor configured to receive an animal nose print;
(b) a computer in communication with the sensor and configured to:
(1) store unique animal nose print data; and
(2) authenticate received nose print data against stored nose print data;
(c) a mobile application in communication with the computer and configured to:
(1) receive notifications of sensor activation;
(2) enable remote control of system functions; and
(3) display historical activation data;
wherein the system is integrated with a home automation controller to coordinate animal-activated functions with household functions.

22. A secure animal identification and access control system comprising:
(a) a deformable sensor pad comprising a material selected from the group consisting of a spring, a cushion, a gel, and a non-Newtonian fluid, the sensor pad configured to:
(1) conform to an animal's nose surface when contacted; and
(2) capture nose print data through the deformable material;
(b) a computer in communication with the sensor pad and configured to:
(1) store authorized nose print patterns; and
(2) authenticate received nose print data; and
(c) an actuator configured to control access to a secured area when authentication is successful;
wherein the system maintains a log of access attempts and successful authentications.

* * * * *